Nov. 19, 1963 G. F. CONRON ET AL 3,111,591

TRANSISTOR STEP COUNTER

Filed Oct. 8, 1959

INVENTORS
GREGORY F. CONRON
MICHAEL T. FISHER

BY Henry L. Shenier

ATTORNEY

United States Patent Office 3,111,591
Patented Nov. 19, 1963

3,111,591
TRANSISTOR STEP COUNTER

Gregory F. Conron, New Canaan, Conn., and Michael T. Fisher, Yonkers, N.Y., assignors to United Aircraft Corporation, East Hartford, Conn., a corporation of Delaware Filed Oct. 8, 1959, Ser. No. 845,245
1 Claim. (Cl. 307—88.5)

Our invention relates to a transistor step counter and more particularly to an improved pulse counter which is extremely simple in construction and which is highly reliable in operation.

Various types of pulse counters are known in the prior art. In one form of pulse counter a coupling capacitor applies pulses to a storage capacitor until such time as the charge on the storage capacitor reaches a predetermined level to trigger an output device to produce a signal representing that a number of pulses have been fed into the circuit. Counters of this type have the defect that, upon the application of a series of input pulses of the same magnitude, the voltage across the storage capacitor does not increase by the same amount for each input pulse. As a result, these circuits are not as reliable as is desired since if an attempt is made to count a relatively large number of pulses, the increase in the last step of the count is so small that the firing of the output device is uncertain. In other words, the number of counts which can be made in each stage of such a device is limited by the consideration that the last step of voltage on the storage capacitor must be sufficiently large so that firing of the output element will be certain. For such a circuit to function properly the coupling capacitor must be very small as compared with the storage capacitor and the peak value of the input pulses should be large with respect to the potential required to fire the output device.

In the keyed multivibrator type of counter known in the prior art, the range of input frequency which can be handled when, for example, the counter is employed to divide the input frequency by six is limited to a theoretical maximum of one octave.

We have invented a transistor step counter which is extremely simple and certain in operation. In our circuit the steps of the staircase wave form produced at the storage capacitor all are of the same size and thus the circuit is extremely reliable. Owing to this characteristic of our circuit, we may divide the number of pulses in an input train of pulses by a relatively large number as compared with the division which can be produced by systems of the prior art. The magnitude of the input pulses in our system need not be relatively large as compared with the potential required to fire the output device.

A further advantage of our improved pulse counter is that it can operate over a relatively wide range of input frequencies as compared with counters such as the keyed multivibrator counter known in the prior art. Our transistor step counter can be cascaded in a number of stages to provide a large frequency division of the input pulses.

One object of our invention is to provide a transistor step counter for producing a staircase waveform all of the steps of which are of the same size.

Another object of our invention is to provide a transistor step counter adapted to divide the number of pulses in an input train of pulses by a relatively large number as compared with the division which can be accomplished by systems of the prior art.

A further object of our invention is to provide a transistor step counter capable of operating over a wide range of input frequencies.

A still further object of our invention is to provide a transistor step counter which can be cascaded in a number of stages.

Other and further objects of our invention will appear from the following description.

In general our invention contemplates the provision of a transistor step counter provided with a bootstrap circuit for applying the counter storage capacitor potential to the common terminal of a series-connected coupling capacitor and diode which apply a series of positive-going pulses to the storage capacitor. This arrangement ensures that the storage capacitor is charged the same amount upon the application of each input pulse to the counter.

In the accompanying drawings which form part of the instant specification and which are to be read in conjunction therewith and in which like reference numerals are used to indicate like parts in the various views.

Figures 1, 2, 3:
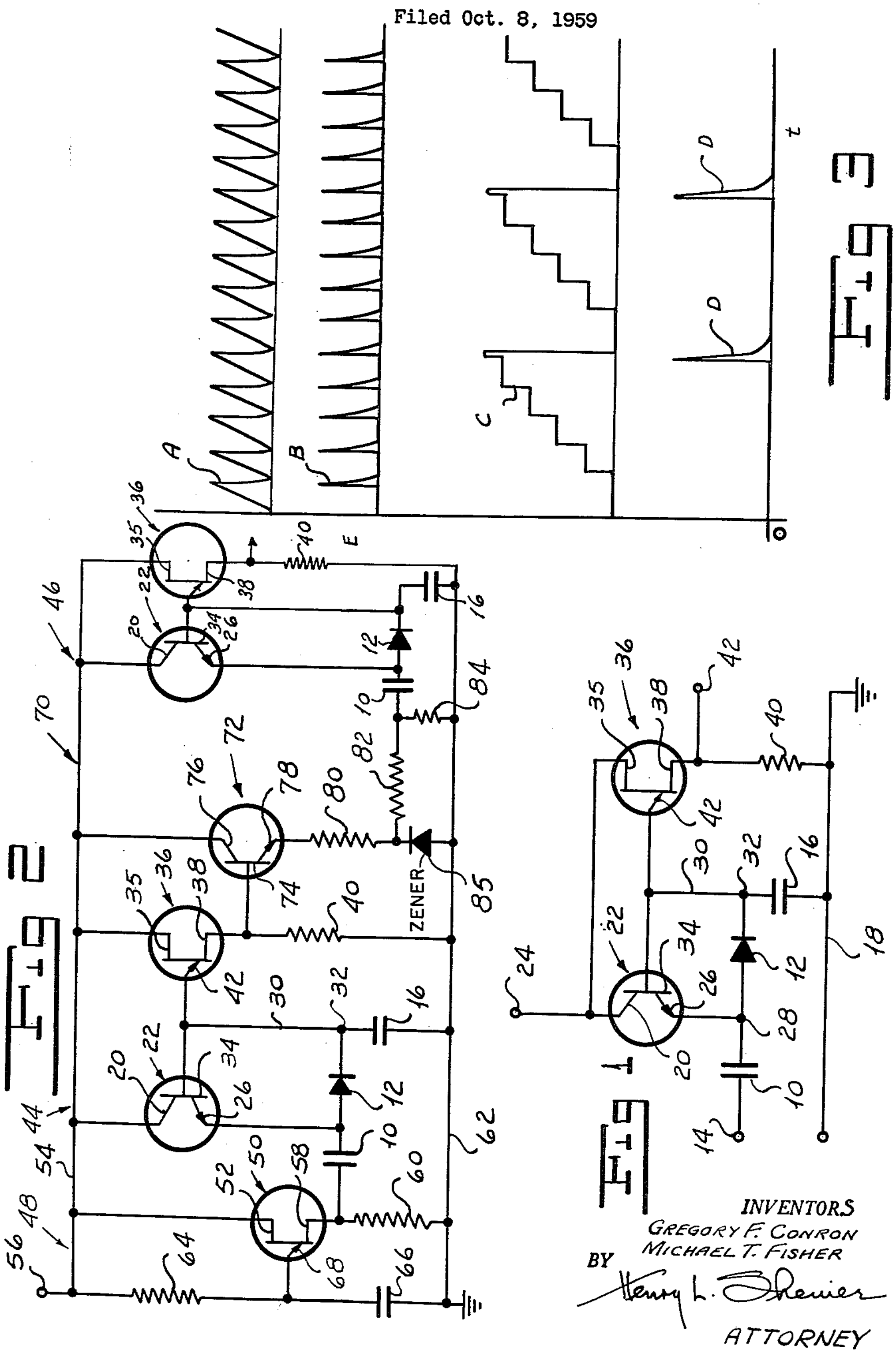
FIGURE 1 is a schematic view of one stage of our transistor step counter.
FIGURE 2 is a schematic view of a number of stages of our transistor step counter connected in cascade.
FIGURE 3 is a diagrammatic view of the wave forms appearing at various points in the circuit shown in FIGURE 3.

Referring now to FIGURE 1 of the drawings our transistor step counter includes a coupling capacitor 10 connected in series with a diode 12 between an input terminal 14 of the circuit and one terminal of a capacitor 16, the other terminal of which is connected to ground conductor 18. A series of positive pulses from any suitable source are applied to the input terminal 14 of the circuit. Upon the application of such a pulse to the terminal 14, capacitors 10 and 16 are charged in the inverse ratio of their respective capacitances. If, for example, capacitor 10 has a capacitance value which is small with respect to the capacitance value of the capacitor 16, the result is that most of the charge from a pulse is gained by the capacitor 10. Owing to the fact that diode 12 passes only in the forward direction, capacitor 16 retains its charge while the charge on capacitor 10 is removed as the input terminal 14 returns to ground potential in the interval between successive pulses.

Considering only the circuit elements just described, upon the application of the next input pulse, capacitors 10 and 16 receive charges in the inverse ratio of their respective capacitance values from the potential difference between the potential across capacitor 16 and that of the input pulse. Thus upon the application of a series of pulses to the terminal 14, the potential across the capacitor 16 increases in steps to approach the peak value of the input pulses. Considering only this circuit and ignoring the other elements shown in FIGURE 1, under the action described above it will be apparent that the steps of voltage across the capacitor 16 decrease in size for successive pulses. This is the operation of pulse counting circuits of the prior art.

We provide our counter with means for producing a staircase wave form across the capacitor 16, all the steps of which are of the same size. We connect the collector 20 of a n-p-n transistor, indicated generally by the reference character 22 to a suitable source of positive potential 24. We connect the emitter 26 of transistor 22 to the common terminal 28 of capacitor 10 and diode 12. A conductor 30 connects the common terminal 32 of diode 12 and capacitor 16 to the base 34 of transistor 22.

Considering the action of the circuit elements just described, upon the application of a positive pulse to the terminal 14, capacitor 10 couples this pulse to the diode 12, which, in turn, passes the pulse to storage capacitor 16. As a result, the potential at point 32 rises by an amount determined by the size of the input pulse and by the ratio of the capacitances of capacitors 10 and 16. It is to be noted that the application of the positive pulse to the emitter 26 of the transistor 22 ensures that the transistor is nonconducting at this time. After the pulse has been applied to the capacitor 16 and the input terminal 14 returns substantially to ground potential, capacitor 10 loses its charge. Owning to the fact that the potential at point 32 is raised, the base 34 of transistor 22 is made positive with respect to the emitter 26 to cause collector current to flow until the potential at terminal 28 is substantially the same as that at terminal 32.

Upon the application of the next positive pulse to the terminal 14, since point 28 has been raised substantially to the potential of point 32, capacitor 16 receives the same charge from this pulse as the charge it received from the first pulse. Thus upon the application of a series of positive pulses to the terminal 14, the potential at point 32 builds up in steps to provide a staircase wave form, all the steps of which are the same size. In other words, the transistor 22 and its associated circuitry functions to "bootstrap" the coupling capacitor 10.

We connect the upper or positive ohmic contact 35 of a unijunction transistor or double-base diode, indicated generally by the reference character 36, to the terminal 24. We connect the lower or negative ohmic contact 38 of the diode 36 through an output resistor 40 to the ground conductor 18. We apply the potential appearing at the terminal 32 to the emitter 42 of the diode 36. As is known in the art, upon the application of a predetermined potential to the emitter 42, a large increase in conduction through the diode results. Thus after a predetermined buildup in step-wise fashion of the potential at point 32, diode 36 conducts to produce a large voltage pulse across resistor 40 to which an output terminal 42 is connected.

Our transistor step counter, one stage of which is shown in FIGURE 1, may be cascaded in a number of stages to produce a large frequency division. Referring to FIGURE 2 we have shown two stages, indicated generally by the reference characters 44 and 46, of our step counter connected in cascade. An oscillator, indicated generally by the reference character 48, provides input pulses for the first stage 44. Oscillator 48 includes a unijunction transistor, indicated generally by the reference character 50, having an upper ohmic contact 52 connected to a conductor 54 leading to the terminal 56 of a suitable source of positive potential. We connect the lower ohmic contact 58 of the transistor 50 through an output resistor 60 to a ground conductor 62. We connect a resistor 64 and a capacitor 66 in series between conductors 54 and 62. We apply the potential appearing at the common terminal of resistor 64 and capacitor 66 to the emitter 68 of the diode 50. With the arrangement shown capacitor 66 charges at a rate determined by the resistance of resistor 64 and by the back resistance of the upper base-emitter junction of diode 50. When the potential across capacitor 66 reaches a predetermined value, diode 50 fires and the capacitor discharges through the lower base ohmic contact 58 to produce an output pulse across resistor 60. This action results in the production of a series of positive pulses across the resistance 60. For purposes of clarity we have illustrated the potential across capacitor 66 schematically by the wave form "A" in FIGURE 3. Similarly we have shown the spikes or pulses of voltage "B" appearing across resistor 60.

Since the elements of the stage 44 of our step counter shown in FIGURE 2 are similar to those shown in FIGURE 1, we will not describe this stage in detail. Similar parts to those shown in FIGURE 1 are identified by like reference characters in FIGURE 2. As will be apparent from the description given in connection with FIGURE 1 hereinabove, the transistor 22 of the stage 44 shown in FIGURE 2 bootstraps the coupling capacitor 10 to ensure that all the steps of the staircase wave form at point 32 are of the same size. For purposes of clarity in FIGURE 3 we have shown the staircase wave form "C" appearing at point 32 where the circuit is arranged to count five pulses before the diode 36 fires to discharge the storage capacitor 16 through the emitter-lower base resistance 40 of the diode 36.

We employ an emitter follower, indicated generally by the reference character 70, for isolating the stages 44 and 46 of the multi-stage step counter shown in FIGURE 2. The emitter follower 70 includes an n-p-n transistor, indicated generally by the reference character 72, including a base 74, a collector 76, and an emitter 78. We connect the emitter-follower resistor 80 in series with voltage dividing resistors 82 and 84 between the emitter 78 and the ground conductor 62. We connect the collector 76 to conductor 54. This emitter-follower circuit 70 acts as a buffer between the stages 44 and 46 to isolate the low alternating current impedance which appears to a preceding stage when the unijunction transistors or double-base diodes of succeeding stages break down.

For the best operation of our step counter, we connect a Zener diode 85 between the common terminal of resistors 80 and 82 and ground conductor 62. This limits the magnitude of input pulses to the succeeding stage 46 of the cascaded counter. For purposes of clarity we have shown the spikes "D" of voltage appearing across resistor 40 after each series of five pulses have been counted in the particular form of our counter shown.

Since the elements of the stage 46 of our step counter are similar to those of the stage shown in FIGURE 1, we have indicated the parts of this stage by the same reference characters as those used for similar parts in the circuit shown in FIGURE 1. It will be apparent that for each five pulses "D" across resistor 40 of the stage 44, stage 46 produces an output pulse across its resistor 40.

In operation of our step counter the series of pulses "B" produced by the oscillator 48, for example, are applied by the coupling capacitor 10 through the diode 12 to the storage capacitor 16 of the stage 44. After the potential across the storage capacitor 16 has been raised by the application of a pulse to the circuit, the input terminal returns substantially to ground potential and capacitor 10 loses its charge. Owing to the fact that the conductor 30 applies the potential across capacitor 16 to the base 34, the base is above the potential of the emitter 26 and transistor 22 is rendered conductive to raise the potential of terminal 28 substantially to that across capacitor 16. As a result, upon the application of a succeeding pulse to the circuit, the potential across capacitor 16 is raised by the same amount as that by which the potential was raised on the occurrence of the first pulse. The result is a staircase wave form at point 32, all the steps of which are of substantially the same size. When the potential across capacitor 16 reaches a value determined by the standoff ratio of the diode 36, the diode conducts to discharge capacitor 16 to produce a spike of voltage across the output resistor 40 of the stage 44. The stage 46 functions in a similar manner to produce an output pulse each time the potential on its storage capacitor 16 reaches a voltage which causes the diode 36 of the stage 46 to break down.

It is to be understood that while we have shown for purposes of simplicity stages which divide the number of input pulses by five, our circuit can be arranged to provide a reliable division by as large a number as ten.

It will be seen that we have accomplished the objects of our invention. We have provided a transistor step counter which is simple in construction and which is reliable in operation. Our counter produces a storage capacitor staircase wave form, all the steps of which are of the same size. With our circuit the magnitude of the input pulses need not be relatively large with respect to the potential required to trigger the output device. Our counter can function over a large range of input frequencies when used as a frequency dividing circuit. Our step counter may be readily cascaded.

It will be understood that certain features and subcombinations are of utility and may be employed without reference to other features and subcombinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

A step counter including in combination a pulse source, a first capacitor, a second capacitor having a first and a second terminal, a rectifier having an anode and a cathode, an n-p-n transistor having a base and an emitter and a collector, a double-base diode having a p-type emitter, a voltage supply having a positive and a negative terminal, means including the first capacitor for connecting the pulse source to the emitter of the transistor and the anode of the rectifier, means connecting the cathode of the rectifier to the first terminal of the second capacitor and the base of the transistor and the emitter of the double-base diode, means connecting the positive voltage supply terminal to the collector of the transistor and one base of the double-base diode, and means connecting the negative voltage supply terminal to the second terminal of the second capacitor and the other base of the double-base diode.

References Cited in the file of this patent

UNITED STATES PATENTS

| | | |
|---|---|---|
| 2,573,150 | Lacy | Oct. 30, 1951 |
| 2,653,236 | Phelan | Sept. 22, 1953 |
| 2,717,958 | Oda | Sept. 13, 1955 |
| 2,751,550 | Chase | June 19, 1956 |
| 2,849,653 | Bleam | Aug. 26, 1958 |
| 2,866,104 | Biggam | Dec. 23, 1958 |
| 2,873,388 | Trumbo | Feb. 10, 1959 |

OTHER REFERENCES

Shea: Transistor Circuits, Wiley & Sons, New York, 1953, page 51 relied on.

"Unijunction Transistor Circuits," pages 56–62 of the General Electric Manual, dated July 23, 1958.